UNITED STATES PATENT OFFICE.

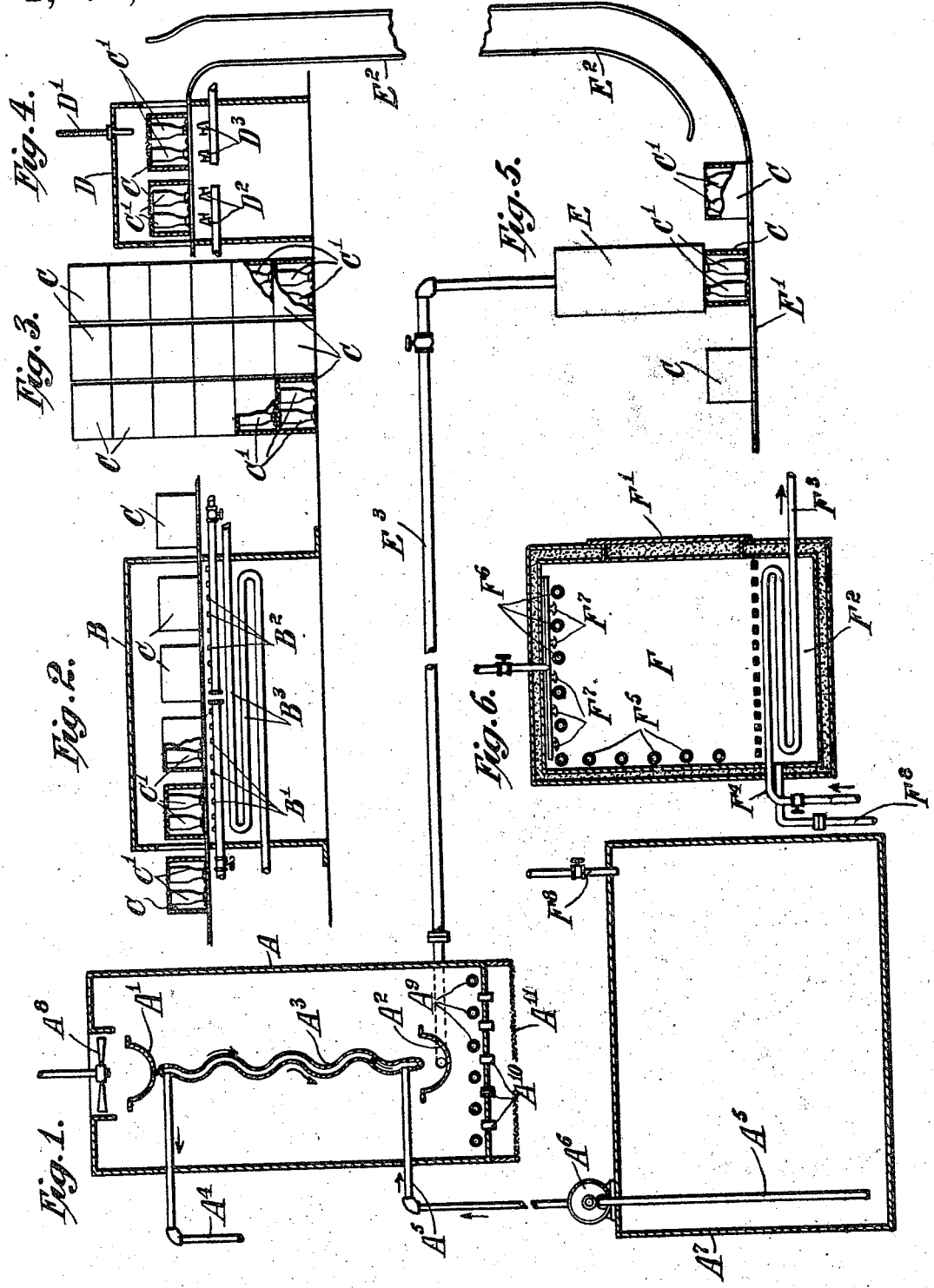

JOSEPH M. W. KITCHEN, OF EAST ORANGE, NEW JERSEY.

METHOD OF TREATING MILK.

1,178,808.

Specification of Letters Patent. Patented Apr. 11, 1916.

Application filed October 25, 1915. Serial No. 57,733.

*To all whom it may concern:*

Be it known that I, JOSEPH MOSES WARD KITCHEN, a citizen of the United States, residing in the city of East Orange, county of Essex, State of New Jersey, have invented an Improved Method of Treating Milk, of which the following is a specification.

The object of this invention is to secure increased efficiency in connection with the pasteurization of milk, especially when that performance is conducted in the final container or bottle; to secure economies in carrying out the process; and to overcome other defects that have been inherent to methods previously practised.

The main structural features that may be used in practising my method of treating milk, are schematically represented in the accompanying drawings: in which, Figure 1 is a combined milk preheater, aerater, hot water receiving tank, and hot water pump; Fig. 2 is a bottle washer and sterilizer; Fig. 3 is a piled stack of inverted bottles in their cases; Fig. 4 is a bottle preheater; Fig. 5 is a bottle filler; and Fig. 6 is a pasteurizing and refrigerating apartment.

The reference characters indicate as follows: A is the preheating and aerating apparatus: $A^1$ is a milk conveying trough; $A^2$ is a milk conducting trough: $A^3$ is a preheating device on which milk flows downwardly over its external surfaces, and hot water is forced internally upward through it: $A^4$ is an exhaust water outlet: $A^5$ is a hot water inlet: $A^6$ is a hot water forcing pump: $A^7$ is a hot water receiving tank: $A^8$ is an exhaust fan that draws air upwardly over the milk as the milk descends. The air is exhausted into the outer atmosphere.

$A^9$ are heating pipes: $A^{10}$ are air inlets; and $A^{11}$ is an air filtering screen.

B is a bottle washing and sterilizing apparatus; $B^1$ are hot water jets; $B^2$ are steam jets; $B^3$ is a steam coil.

C are bottle cases filled with inverted, washed, and sterilized bottles $C^1$. The washing and sterilization are performed at convenient times, and the cases of bottles are stacked in a convenient place, the bottles remaining inverted to prevent dust from falling into them. Inasmuch as these bottles remain stacked until immediately prior to their filling, they become reduced in temperature to the temperature of the room in which they are stacked.

D is a device for preheating the cooled bottles immediately prior to their filling. The temperature in this device is indicated by the thermometer $D^1$ and the bottles are progressively heated by upwardly projected sprays of hot water in progressively larger amounts from the jets $D^2$, and are further heated by the steam jets $D^3$; the ultimate degree of heat attained by the bottles being below 130° F.

E is a bottle filling device of any known character, located on and attached to a bottling and capping table $E^1$. The preheating device is preferably located at a higher level than the device E. The cases of inverted bottles are vertically reversed in traversing the track $E^2$, and are immediately filled with the milk that has been preheated in the apparatus A, and which is conveyed to the bottle filling device by the disconnectible conduit $E^3$.

F is one of the number of pasteurizing and refrigerating apartments of any convenient size. It is entered by the door $F^1$. The apartment has moisture impervious walls which are more or less insulated. There is a water pool $F^2$ below the slatted floor of the apartment. This pool has a steam coil in it into which the steam enters at the high level inlet $F^4$, and finds a return to the steam generator of the plant, through the outlet $F^3$.

$F^5$ and $F^6$ are refrigerating pipes, and $F^7$ are water spraying jets.

$F^8$ is an outlet for the cooling water, which becomes heated from the hot bottles in their cooling. The water is conveyed to the tank $A^7$, through the disconnectible conduit $F^8$. It will be observed that through the operation of this apparatus, there is a circulatory heat transferring action that effects a considerable economy in carrying out the performance of pasteurization in the final container. Various subsidiary features of a plant of this character are not represented in the drawings because they have no direct relation to the invention here claimed.

The defects remedied by my invention are: (1) that of ordinary methods of pasteurizing, in which some part of the milk is brought in contact with too highly heated surfaces, whereby a part of the milk has its taste and physical character changed; and in which the upper parts of milk being heated in a bottle may receive the undesirable heating influence of a high degree of temperature for too long a time; (2) the infections of milk that under old methods are likely to occur during bottling the milk; (3) the infections which are conveyed through the ordinary cardboard and some other closures of bottles that are commonly used; (4) the common method of washing and high heat sterilization of bottles only immediately prior to their filling and while the bottles are very hot, which practice does not allow of sufficient time to secure a complete sterilization of the bottles with certainty before their filling, and that it takes too long a time to cool the bottles from a sterilizing to a pasteurizing temperature; (5) the filling of very hot bottles with very hot milk at substantially a pasteurizing temperature, which practice makes the handling of the very hot milk and bottles unnecessarily uncomfortable for the working attendants of the milk plant; (6) having the milk so hot at the time of filling the bottles which results in over heating a part of the milk during the placing of the bottled milk in the apartment, tank, or whatever receptacle is used for containing and holding the bottled milk, because the time occupied in filling and placing enough bottles to fill the apartment, requires considerable time from the beginning of the filling of that apartment or other receptacle, up to the end of its filling with the very hot filled bottles. Under such conditions some of the bottled milk placed in the bottle holding apartment or receptacle is over heated by too long holding at a high heat.

It should be noted that if milk is placed into the final container while the milk is cold, and is heated entirely in the container, the milk at the lower levels of the container is only heated to the pasteurizing temperature in from seven to ten minutes after the top layers are heated. Hence, those top layers in the container are over heated, and this results in a change in the taste of the top layers of the milk, and this measurably prevents the appearance of the so-called cream line in the container; a point which is of considerable practical importance in connection with the commercial handling of milk; consumers feeling that they are defrauded unless they can see the cream line.

When milk or cream is heated, there is more or less of a fusion of the butter fat globules, with a consequent lesser showing of the so-called cream line, which line is easily to be observed in bottled raw milk. On this account it will be obvious that it is desirable that all the milk in all the bottles, while being treated, should only be brought to as high a temperature as is necessary to secure the pasteurizing effect, which temperature is usually not above 145° F.; and that the milk should be held at that temperature only as long as is necessary to secure the destruction of pathogenic germs, which time is about 30 minutes. Therefore it will be seen that everything which will interfere with this special uniformity of degree of temperature in applying the heat, and of the time of holding the milk at that temperature in all parts of the milk being treated, is an important matter from the commercial point of view.

The present invention is largely for the overcoming of this particular defect in older practices.

Another object of the invention is to secure economy in the pasteurizing treatment of milk through the coincident performance of several processes, namely; that of aeration, pre-heating, and the introduction of the heat economizing principle of the vertical counter-current transfer of heat.

In applying this invention, my procedure is preferably as follows: Milk that has been transported to and preferably held at the milk plant, at the unusually low temperature of about 30° F., is passed through an aerating apparatus from a high level to a low level, running in a very thin film over sheet metal surfaces which are internally traversed and warmed by an upwardly ascending current of warm water, preferably not heated to above 150° F. The warm water which is preferably only heated to a degree necessary for the preheating of the milk, is pumped up through the aerating and heating apparatus. The milk or cream gravitating downward over the heating surfaces of the apparatus, at first meets moderately warm water and is able to absorb heat from the water. As the milk gradually descends, it meets zones of water of gradually increasing heat, and at a desired temperature, is finally received in a tank at the bottom of the apparatus. Air for aerating the thin film of milk or cream is mechanically forced or drawn through the apparatus, and if desired, this air is first passed over either steam or water heating pipes, or surfaces that may be heated by hot gases passing through them. This warmed and somewhat dry air passing upwardly over the descending film of milk, besides assisting the internally pumped warm water in preheating the milk, is impregnated with any of the obnoxious fumes from the milk, which are usually more or less present in all milk, and then escapes through an opening at the top of the apparatus. Preferably, the air is carried upwardly through the apparatus in an induced draft. Such an induced draft has slightly less than atmospheric pressure, and on this account its power of inducing quick elimination of the fumes from the milk is enhanced. The flow of the milk and the flow of the hot water is so arranged as to individual quantity, that the milk is not raised to the pasteurizing temperature. A temperature between 100° and 130° F. is held to be as high as is desirable for the preheating of the milk. The heating may be even less than 100° F.

Inverted new bottles for the milk, or the returned old bottles, are first washed and scalded in the ordinary way, and are then subjected for a sufficient length of time to a high sterilizing heat, and in cases with the bottles still inverted, are then stacked in a convenient place for reuse, where they become reduced to a room temperature. These bottles before feeding them to the bottle filling apparatus, are passed through a secondary heater in which they are gradually given a considerable heating, and preferably, by sprays of steam and hot water, but are not heated to a pasteurizing or sterilizing temperature. The bottles are heated preferably to the same temperature that is given to the milk in its pre-heating. The temperature of the bottles is gradually raised, and preferably, to the same temperature as that of the milk that is placed in the bottles. There may be a variation of a very considerable number of degrees between the temperature of the bottles and that of the milk so long as a variation in temperature does not exist of sufficient extent to induce a too great strain from unequal expansion on the glass bottles, which would otherwise be likely to be followed by breakage.

In the older art, the sterilizing process given to the bottles prior to the bottling, has usually been maintained for about two minutes; but this time I do not consider to be sufficient to certainly effect sterilization. But if the bottles are sterilized immediately before the bottling of the milk, and as the very high heat of the sterilizing process must be reduced in the bottles, to or close to the pasteurizing temperature, before filling the bottles in order to prevent breakage of the bottles and overheating parts of the milk; the general process goes on too slowly unless a very much increased floor area of the milk plant is available, and unusually expensive and cumbersome machinery used.

My process has for one of its purposes an economical utilization of labor and invested capital. Such a short time as is usually given to sterilization is not sufficient to be absolutely safe. In my method I give a sufficiently long sterilizing of the bottle to secure absolute safety. This is done as a separate preliminary operation, and is followed by a considerable cooling of the bottles. I then perform a secondary heating immediately before placing the milk in the bottles, which is for the purpose of preventing overheating of some of the layers of milk in the bottles, and some overheating of all of some of the bottles in the final heating of the milk; as well as for preventing fracture of the bottles due to putting hot milk in cold bottles; and for washing out dust and bacteria that may have gained access to the interior of the bottles after their washing and sterilization. Inasmuch as a complete sterilizing temperature is much higher than a pasteurizing temperature, it will be obvious that if the bottles are sterilized immediately before filling, it takes too much time, or appropriates too much floor space, in reducing the temperature to a pasteurizing temperature, and also leaves great uncertainty as to the temperature of the bottles when partly cooled. It is particularly desirable to avoid contact of milk with any surface heated higher than is necessary, either in its preheating or in its pasteurization.

I do not confine myself to the method of preheating milk in connection with the aerating process, though that is a convenient and economically desirable method. Any method of preheating in which a definite temperature can be secured, though preferably a method through contact with heating surfaces of moderate temperatures, may be carried out. Any known method of filling the bottles with the preheated milk may be used.

After their filling the bottles are capped, and preferably, with a metal cap in the use of which is carried out the principles which I explain in my co-pending application for Patent, Sr. No. 874,385. The basic principle applied in that bottle closure is in having a combined pressure and protection cap that shields the bottle lip and mouth from all gravitating fluids or solid matters that might be of an infective nature, and which cap is of sufficient size to retain pneumatically a volume of sterile air under the cap sufficient in amount to draw upon in the in drawing of air into the bottle during the cooling of the bottle.

The filled, capped bottles in their cases, are conveyed into pasteurizing and cooling-holding apartments, which are practically hermetically closed by proper doors, and which are constructed with non-conducting impervious walls. In the interior of these apartments, a sufficient number of which are provided, I provide apparatus for the higher heating and pasteurizing of the preheated milk, and in that case, the higher heating of all the milk that has been placed in any single apartment, is done at one time. This avoids having some part of the milk which may be first placed in the apartment, retained for too long a time at a pasteurizing temperature while other parts of the milk are not heated so long a time. This process avoids the positive defect of differences in the taste of the several parts of the milk, which would otherwise be possible and which might be recognized by consumers from day to day. Apparatus is also provided in these apartments for the cooling of the milk, either by spraying with water of various temperatures, or by refrigerative piping or by blowing cold air. If the cooling is done by water, the waste water from the first stage of cooling is used to preheat the milk, either alone or by reinforcement with heat received by passing the waste water through a water-heater. The moderately heated waste water used in the second stage of the cooling of the bottles is advantageously used for the first cooling of the bottles.

In the regenerative use of the heat of the cooling of the bottles, considerable economy is effected. So far as the heating of the bottles of milk is concerned, I prefer to heat them in the referred to apartments by means of evolving warm vapor from pools of water at the bottom of the apartments, through which heating coils are run and from which the warm vapor rises through the bottle cases, which have permeable wire tops and bottoms. Proper provision is made for observing the interior temperature with accuracy in these apartments, and also for determining the temperature of the milk at the bottoms of the bottles through the use of test bottles connected with an outside located temperature indicating apparatus. In these apartments the milk is not only cooled to the ordinary holding temperature of 45° F. It is cooled much below such ordinarily practised cooling temperatures, and preferably, close to the freezing point of milk; at which temperature there is substantially no fermentation occurring during the several days in which the milk is usually held prior to its conveyance and distribution to consumers.

It will be noted that pasteurizing temperatures do not destroy some of the putrefactive types of bacteria and various spores in milk, which proliferate at the temperatures at which milk is usually held after its pasteurization and up to the time of its delivery to the consumer. Putrefactive bacterial growths in milk tend to induce decomposition accumulations of undesirable character in milk. The low temperatures I apply in this connection, I regard as highly important in connection with the providing of safe milk. The milk being held in the apartment in which it is refrigerated, undergoes practically no decomposition changes during the usual short time of its holding, and being deeply refrigerated at the time of its removal, retains that frigidity sufficiently during the time in which the milk is being distributed.

In heating and cooling milk, I do not confine myself to any special means or method. Any known means or method may be used.

Sterilizing and filling the bottles with milk of a pasteurizing heat in one continuous operation is not only objectionable in connection with a lack of certainty as to securing effective pasteurization. It is economically lacking in that the working force at the milk plant has its time of work too much concentrated into too few hours. It is economically better to perform the washing and sterilization of the bottles at a separate time each day from the time of heating and filling the milk into the bottles. This spreading of the working efforts in the milk plant results in a financial saving. Heating the bottles and milk at or prior to the time of bottling, at a lower temperature than is common, although theoretically that practice may not be economically equal to the higher heating, still, an advantage is gained in that the preheating process can be effected with moderately hot water instead of steam, and the heat in the water can be more economically applied through the use of heat economizing heat transferring apparatus.

The substitution of an interrupted succession of steps, which, however, are coöperative, as practised in this invention, in place of the uninterrupted method, while it results in a slight loss of heat in the cooling and heating of the bottles, gives aggregate results that are in advance of the results from higher heating, by securing a better edible quality, as well as a better sanitary quality; and also over-head general working economies that can be secured in a milk handling plant. In particular, the present advance of applicant, pertains to milk plants handling very large quantities of milk, where floor space is limited and where the element of time is an important matter, especially in connection with utilizing the working force to the best advantage over the entire working day.

As a further part of my invention, and to secure a greater uniformity in the heating of all of the milk in the bottles, and of all the bottles of milk under treatment at one time, I, using the species of bottle closure for which I was granted Patent No. 1,141,553, issued June 1st, 1915, may reverse vertically the bottles one or more times and may change the position of the bottles from one level to another zone at a different level of the apartment while I subject the bottles to a pasteurizing heat. The bottle closure referred to allows of that procedure.

What I claim as new is:

1. The method of treating milk herein described, which consists in performing the following combination of coöperating steps, namely: (1) aerating cold milk and preheating the milk during the step of aeration to a temperature not to exceed 130° F., (2) washing a milk bottle and sterilizing the bottle during a time that is required for its complete sterilization, (3) cooling the milk bottle to a temperature lower than 130° F., (4) spraying the cooled bottle with steam and hot water until the temperature of the bottle is approximately that of the preheated milk, (5) placing the pre-heated milk in and filling the heated milk bottle, (6) capping the filled milk bottle with a metal impervious bell cap retaining warm air under its convexity when placed on the bottle, (7) placing the capped bottle in a substantially closed-to-air apartment, (8) subjecting the bottle while in the apartment to a pasteurizing heat, (9) holding the milk in the apartment for a sufficient length of time to secure the pasteurization of the milk, and (10) cooling the heated milk to a temperature sufficiently low to substantially prevent fermentation in the milk while holding the milk in said apartment.

2. The method of treating milk herein described, which consists in, heating the bottles in which the milk is to be placed, from a room temperature to a temperature approaching to, but not to exceed 130° F.; heating milk approximately to a temperature of, but not to exceed the temperature of the bottles in which the milk is placed; filling the bottles with the heated milk capping the bottles; heating the capped bottles and the milk therein contained at a pasteurizing temperature; holding the heated bottles and contained milk at a pasteurizing temperature until pathogenic germs are destroyed in the milk; and cooling the bottles and contents thereof.

3. The method of treating milk herein described, which consists in, aerating cooled milk and preheating the milk during the aeration of the milk; placing the aerated and preheated milk in clean sterilized bottles of a temperature sufficiently near the temperature of the preheated milk to avoid a breaking strain on the bottles; closing the bottles; heating the closed bottles and preheated milk to a pasteurizing temperature; holding the heated milk until the pasteurizing performance is effected; and cooling the pasteurized milk without removal of the milk from the position in which it has been pasteurized, said preheating being effected by heat taken from the milk in said cooling.

4. The method of treating milk herein described, which consists in, pre-heating milk to a temperature approximately to but below a pasteurizing temperature; placing the pre-heated milk in a container having a temperature below 130° F., capping the container; pasteurizing the pre-heated milk while in the container; and cooling the pasteurized milk.

5. The method of treating milk herein described, which consists in, preheating milk and aerating the milk during its heating; bottling the milk; pasteurizing the milk in the bottle; and cooling the pasteurized milk by transfer of heat in the milk to water, the preheating of the milk being effected by heat transferred to the water from the pasteurized milk cooled by the water.

6. The method of treating milk herein described, which consists in, (1) pasteurizing milk, (2) cooling the milk with water, said water being heated in the cooling of the milk, (3) preheating milk with the preheated water run in countercurrent to the milk and aerating the milk in its preheating; and (4) bottling the preheated milk.

7. The method of treating milk herein described, which consists in, (1) bottling a preheated milk, (2) pasteurizing the preheated milk, (3) cooling the bottled milk with water, and (4) preheating the milk by currents of water heated in cooling the milk, and by warm air.

8. The method of treating milk herein described, which consists in, (1) sterilizing a bottle at a sterilizing heat, (2) cooling the bottle to a room temperature, (3) reheating the bottle at a temperature above a room temperature but not to exceed 130° F., (4) preheating milk to a temperature approximating the temperature of the bottle, (5) placing the preheated milk in the preheated bottles, (6) subjecting the preheated milk and the bottle containing the milk to a secondary heating of a temperature sufficient to pasteurize the milk, and (7) cooling the milk and bottle.

9. The method of treating milk herein described, which consists in, (1) preheating the milk from a cold, non-fermentative holding temperature to a temperature higher than the holding temperature and higher than atmospheric temperatures but lower than a pasteurizing temperature by bringing said milk into contact with a heating surface of a temperature lower than a pasteurizing temperature, (2) bottling said preheated milk, and (3) further heating the milk to a pasteurizing temperature.

10. The method of treating milk herein described, which consists in preheating the milk to a temperature approximating to but lower than a pasteurizing temperature, and placing the preheated milk in a container that has been subjected to a sterilizing heat, cooled and reheated to a temperature approximately that of the preheated milk, but lower than a pasteurizing temperature, preventing the milk during its pasteurization and after its pasteurization from germinal contamination in the bottle, giving a secondary heating to the milk in the bottle at a pasteurizing temperature, holding the milk at a pasteurizing temperature until pasteurization has been effected, and cooling the milk at a temperature below 40° F.

JOSEPH M. W. KITCHEN.

Witnesses:
 BEATRICE MIRVIS,
 GEO. L. WHEELOCK.